US006687718B2

(12) United States Patent
Gagne et al.

(10) Patent No.: US 6,687,718 B2
(45) Date of Patent: *Feb. 3, 2004

(54) METHOD AND APPARATUS FOR CASCADING DATA THROUGH REDUNDANT DATA STORAGE UNITS

(75) Inventors: Mathieu Gagne, Boston, MA (US); Yuval Ofek, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 230 days.

This patent is subject to a terminal disclaimer.

(21) Appl. No.: 09/740,281

(22) Filed: Dec. 19, 2000

(65) Prior Publication Data

US 2001/0007102 A1 Jul. 5, 2001

Related U.S. Application Data

(63) Continuation of application No. 09/251,812, filed on Feb. 17, 1999, now Pat. No. 6,209,002.

(51) Int. Cl.[7] .............................................. G06F 17/30
(52) U.S. Cl. .......................................... 707/204; 707/10
(58) Field of Search ........................ 707/8, 10, 200–204

(56) References Cited

U.S. PATENT DOCUMENTS

| 4,866,611 A | 9/1989 | Cree et al. ............. 364/705.08 |
| 4,975,690 A | 12/1990 | Torres ........................ 345/340 |
| 5,093,787 A | 3/1992 | Simmons ..................... 705/33 |
| 5,392,390 A | 2/1995 | Crozier ....................... 345/335 |
| 5,432,922 A | 7/1995 | Polyzois et al. ........ 395/182.4 |
| 5,434,994 A | 7/1995 | Shaheen et al. ............. 707/201 |
| 5,469,503 A | 11/1995 | Butensky et al. ........... 379/265 |
| 5,479,615 A | 12/1995 | Ishii et al. ..................... 710/54 |
| 5,495,606 A | 2/1996 | Borden et al. ................. 707/3 |
| 5,504,888 A | 4/1996 | Iwamoto et al. ............ 707/200 |
| 5,579,318 A | 11/1996 | Reuss et al. ................. 370/410 |
| 5,592,660 A | 1/1997 | Yokota et al. .................. 707/8 |
| 5,596,706 A | 1/1997 | Shimazaki et al. ..... 395/182.04 |
| 5,596,745 A | 1/1997 | Lai et al. ..................... 707/103 |
| 5,603,024 A | 2/1997 | Goldring .................... 707/203 |
| 5,615,364 A | 3/1997 | Marks ........................ 707/202 |
| 5,625,818 A | 4/1997 | Zarmer et al. .............. 707/104 |
| 5,634,052 A | 5/1997 | Morris ........................ 395/601 |
| 5,649,089 A | 7/1997 | Kilner ..................... 395/182.04 |
| 5,799,147 A | 8/1998 | Shannon ................ 395/182.04 |
| 5,857,208 A | 1/1999 | Ofek .......................... 707/204 |
| 6,092,066 A | 7/2000 | Ofek ........................... 707/10 |
| 6,101,497 A | 8/2000 | Ofek ........................... 707/10 |
| 6,442,551 B1 | 8/2002 | Ofek ........................... 707/10 |

FOREIGN PATENT DOCUMENTS

| EP | 0593062 | 10/1993 |
| WO | 8601018 | 2/1996 |
| WO | 9709419 | 5/1997 |
| WO | 9820419 | 5/1998 |

*Primary Examiner*—Maria N. Von Buhr
(74) *Attorney, Agent, or Firm*—George A. Herbster

(57) ABSTRACT

A data storage facility for transferring data from a data altering apparatus, such as a production data processing site to a remote data receiving site. The data storage facility includes a first data store for recording each change in the data generated by the data altering apparatus. A register set records each change on a track-by-track basis. A second data store has first and second operating modes. During a first operating mode the second data store becomes a mirror of the first data store. During a second operating mode the second data store ceases to act as a mirror and becomes a source for a transfer of data to the data receiving site. Only information that has been altered, i.e., specific tracks that have been altered, are transferred during successive operations in the second operating mode. Commands from the local production site initiate the transfers between the first and second operating modes.

36 Claims, 6 Drawing Sheets

METHOD AND APPARATUS FOR CASCADING DATA THROUGH REDUNDANT DATA STORAGE UNITS

CROSS REFERENCE TO RELATED APPLICATIONS

This application is a continuation of U.S. Ser. No. 09/251,812 filed Feb. 17, 1999, now U.S. Pat. No. 6,209,002.

U.S. Pat. No. 6,092,066, granted Jul. 18, 2000 Ser. No. 08/656,035 filed May 31, 1996, for a Method and Apparatus for Independent Operation of a Remote Data Facility which application is assigned to the Same Assignee as this application.

U.S. Pat. Ser. No. 08/842,953 filed Apr. 25, 1997 by Yuval Ofek for a Method and Apparatus for Independent and Simultaneous Access to a Common Data Set, which application is assigned to the same Assignee as this application now U.S. Pat. No. 6,101,497 granted Aug. 8, 2000.

BACKGROUND OF THE INVENTION

1. Field of the Invention

This invention generally relates to redundant data storage devices in a data processing network and more particularly to a method and apparatus that enables data to cascade through multiple redundant data storage units.

2. Description of Related Art

The maintenance of data integrity by data redundancy has become a very important issue. Data redundancy has several forms or variations. At a single site, mirroring or RAID redundancy protects against disk or other storage failure. In another form described in U.S. Pat. No. 6,092,066 and others, redundancy is achieved by duplicating a local system at a remote location. The use of a remote location prevents data loss due to natural disasters and the like at one site.

In accordance with the foregoing U.S. Pat. No. 6,092,066 all data processing activity occurs at a "local" or "production" site that contains a host system for processing data stored in a data storage facility. A geographically remote or backup site includes a data storage facility as a "redundant" facility for maintaining a restoration or recovery data set. In this system each time the host at the production site writes data to the production site data storage facility, the production data storage facility automatically writes data to the remote storage facility. In many, if not most, of these applications, writing data to the remote site data storage facility requires a transfer across a high bandwidth communications link so the backup procedure does not affect operations at the production facility. T3 and ESCON lines are typically preferred as the communications links despite their expense.

U.S. Pat. No. 6,101,497 Ser. No. 08/842,953 discloses another concept involving a BCV device typically used at the production site. In this approach a data set, for example a "logical volume", on a production site data storage facility, i.e., a "production volume", operates in a normal fashion. Another logical volume at this same site is designated as a "BCV volume". An ESTABLISH command connects the BCV volume to the production volume so that the BCV volume synchronizes with the production volume. A SPLIT command thereafter can separate the BCV volume from the production volume making the data stored on the BCV volume available for another application.

This other application may alter the data stored on the BCV volume. Consequently whenever the BCV volume is reconnected with the production volume, it is necessary to transfer data to the BCV volume that represent changes in both the BCV volume and the production volume. An alternative is to reconnect the BCV volume to the production volume by issuing another ESTABLISH command. However, this command will replace all the data on the BCV volume so all the data from the production volume must be transferred to the BCV volume whether or not changes have occurred.

In the past locating data storage facilities at a production site and a single remote site has been acceptable. In certain critical applications it is now also desirable, and in some situations mandatory, to store still another restoration copy at a third site that is remote from the first two sites. This requires some approach for copying the data from the production site to both remote sites, all transparently to the operations at the production site. Merely repeating the foregoing approach for copying data from a production site to a single remote site involves excessive communications costs. A second high-speed communications link will be required between either the production site and the second remote site or between the first and second remote sites. What is needed is a way to establish a redundant data copy over a less costly communications link without any significant disparity in the data that exists at various remotely located sites such that all the data storage facilities are in synchronism or nearly in synchronism.

SUMMARY

Therefore it is an object of this invention to provide a method and apparatus for establishing redundant data storage facilities that can communicate over less costly communications links.

Another object of this invention is to provide a method and apparatus for achieving redundant disk storage at geographically remote sites on an economical basis.

Still another object of this invention is to provide a method and apparatus for providing redundant data storage at two or more geographically remote sites using an economical communications link.

Yet another object of this invention is to provide a method and apparatus for providing redundant data storage at two or more geographically remote sites using an economical low-bandwidth communications link.

Yet still another object of this invention is to provide a data processing network in which data processed at a production site is stored at two or more redundant storage sites with redundancy being achieved transparently to operations at the production site.

In accordance with this invention, a data storage site remote from a data processing facility that alters data, such as a production facility, transfers data to another site remote from the data storage facility. The data storage facility at the remote site includes first and second data stores. The first data store receives data from the production site. A data change recorder identifies changes that the data processing facility makes in the first data store. A first operating control establishes a first operating mode during which the second data store receives data from the first data store according to the changes recorded in said change recording means. After this operation is complete, a second operating control can establish a second operating mode for copying data from the second data store to the other remote site according to the changes recorded in said data change recorder.

In accordance with another aspect of this invention, data is transferred between a production site and a remote site. The production site includes a host and production storage facility; the remote site, a remote storage facility including a first data store and a second data store wherein the first data store receives data from the production facility on a track-by-track basis. The host can issue a plurality of cascade commands to enable the definition of a plurality of track status tables for identifying each track in the first data store that the production facility changes. In addition, the host can establish first and second operating modes. In the first operating mode the second data store receives data from the first data store according to the changes recorded in the track status tables. During the second operating mode data from the second data store is copied to the remote storage facility according to the changes recorded in the track status tables at the time the second mode is established.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

General Operation

Figure 1:
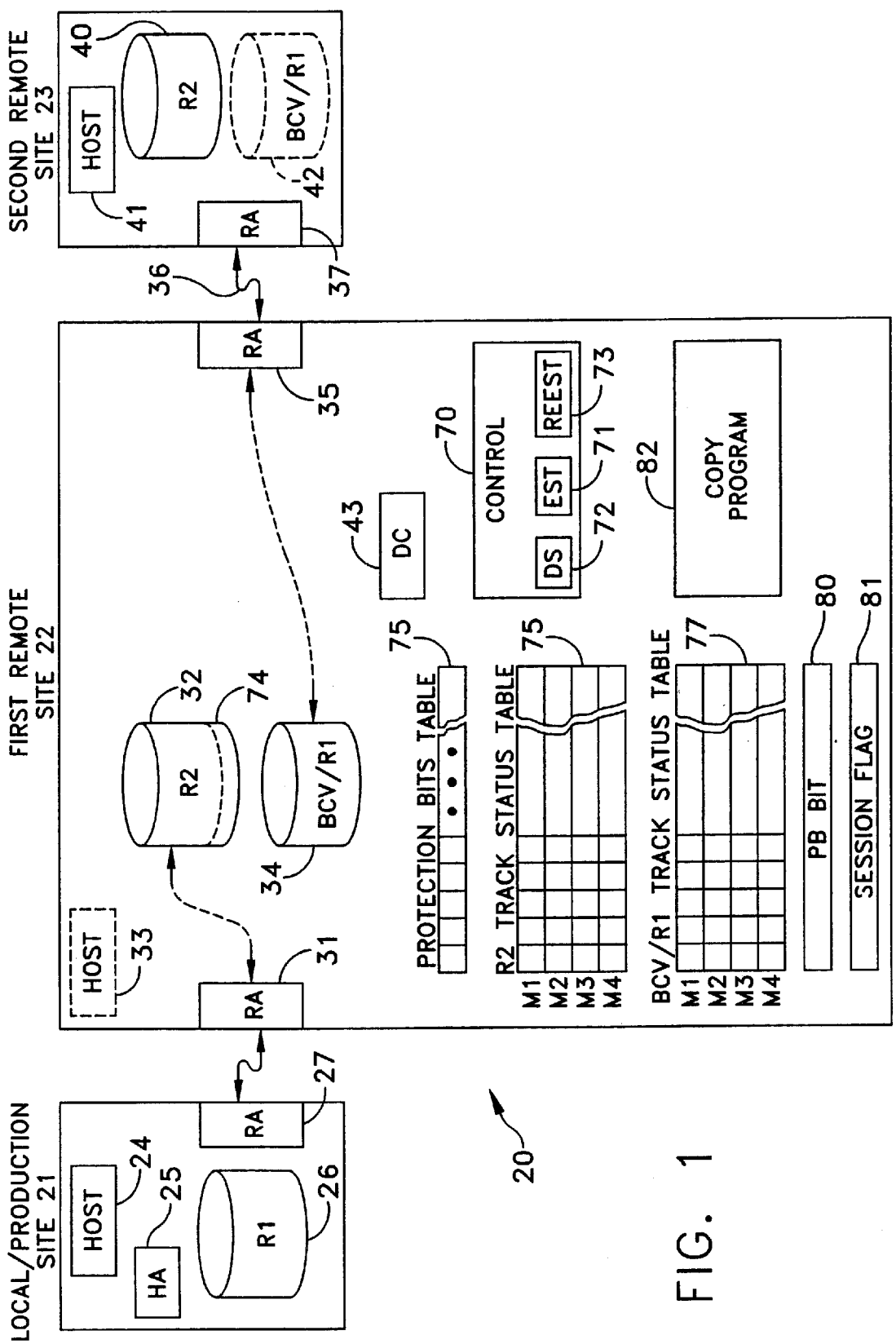
FIG. 1 is a block diagram of a data processing network including a production facility and two geographically remote facilities.

FIG. 1 depicts a data processing network 20 with equipment located at a local or production site 21, a first remote site 22 and a second remote site 23. The first and second remote sites 22 and 23 typically will be geographically remote from the local production site 21 and from each other. However, as will become apparent, the equipment at the local production site 21 and first remote site 22 could be collocated.

A first level of redundancy is achieved in the data processing network 20 through interactions between the local production site 21 and the first remote site 22. As known, a host 24, that includes one or more central processors and a main memory, operates on various programs. Periodically the host 24 will effect a transfer through a host adapter 25 to a disk storage device. This disk storage device may have many physical disk drives organized into discrete sections for storing related information. These include files or other data blocks. In the context of the equipment manufactured by the assignee of this invention, a typical storage section is a logical volume comprising a number of contiguous disk tracks and transfers are made on a track-by-track basis. In FIG. 1 an R1 logical volume 26 is representative of the many logical volumes that normally are included in such a disk storage facility. As will also be apparent the host 24 retrieves any information it needs from such a production storage facility through the host adapter 25. Such systems are well known in the art. U.S. Pat. No. 6,092,066 describes one such system.

Although not shown, the local production site 21 may provide redundancy for the R1 logical volume 26. For example, the R1 volume may actually be mirrored or constituted by an array of logical volumes in any one of various RAID configurations thereby to prevent failure of a particular physical disk drive from interrupting operations by the host 24. As will become apparent, this invention can be applied notwithstanding any redundancy scheme implemented at the local production site 21.

As is also known in the prior art and described in U.S. Pat. No. 5,544,347 to Yanai et al. and assigned to the same assignee of this invention, discloses another redundancy scheme that can be implemented by mirroring the data in the R1 logical volume 26 at the first remote site 22. More specifically in this configuration the local production site 21 includes a remote adapter (RA) 27 that connects through a high speed communications link, such as an ESCON or T3 communications line, to a corresponding remote adapter 31 in the first remote site 22. In this configuration each time the host 24 writes data to the R1 logical volume 26, the remote adapter 27 responds by transferring that data through the high speed communications link to the remote adapter 31 in the first remote storage site 22 for transfer to an R2 logical volume 32. Thus each WRITE operation is reflected or conveyed to the R2 logical volume 32 that acts as a remote mirror with respect to the R1 logical volume 26. If a natural disaster strikes the local production site 21, the data is readily available in the R2 logical volume at the remote site. Moreover if a host 33 is located in the first remote site 22, it is possible for all operations to shift to the first remote site for continued operation without any undetected data losses.

As previously stated, U.S. Pat. No. 6,101,497 discloses a data processing network that includes a BCV logical volume associated with a data storage facility. In accordance with this invention, a BCV/R1 logical volume 34 is included in the first remote site 22. It can comprise any dedicated logical volume within the first remote site 22 preferably on a physical disk drive that is different from the physical disk drive that contains the R2 logical volume 32.

In accordance with this invention and as described in more detail later, the BCV/R1 logical volume 34 can be connected either to the R2 logical volume 32 or to a remote adapter 35. In a first operating mode, the BCV logical volume 34 synchronizes with the R2 logical volume 32. In a second operating mode with the BCV/R1 logical volume 34 attached to the remote adapter 35, data will transfer over another communications link 36 to a remote adapter 37 in the second remote site 23 for transfer to an R2 logical volume 40 or other data receiver. In one embodiment of this invention, the second remote site 23 contains a host 41 and eliminates the need for the existence of the host 33 at the first remote site 22. Thus the second remote site 23 becomes the restoration site or secondary site for operating on the data if a natural disaster occurs at the local production site 21.

The second remote site is shown as containing an optional BCV/R1 logical volume 42. As described more fully later, including this logical volume at the second remote site 23 could allow a replication of the function performed in accordance with this invention to a third remote site.

In general terms, a remote site constructed in accordance with this invention will have the basic structure of the first remote site 22 that constitutes a data storage facility. It includes a first data store in the form of the R2 logical volume 32 for connection to the local production site 21 that can alter data. The BCV/R1 logical volume 34 constitutes a second data store. In response to a first command, the data store facility in the first remote site 22 operates in a first operating mode during which the R2 logical volume 32 receives data from the remote adapter 31 and thereby is responsive to changes made to the data in the R1 logical volume 26. Typically this is accomplished synchronously so a high-speed communications link 30 is necessary. In this operating mode the BCV/R1 logical volume 34 is considered to be operating in its BCV or first operating mode.

In accordance with this invention, the BCV/R1 logical volume 34 can shift to a second, or R1, operating mode once synchronism is achieved in the first operating mode. In the second operating mode the first remote site transfers data from the BCV/R1 logical volume 34 through the remote adapter 35, communications link 36 and remote adapter 37 to the R2 logical volume 40. The timing of shifts from the first to the second operating modes will be determined by a system operator. However, shifts from the second operating mode to the first operating mode will generally be made after the data transfer to the R2 logical volume 40 is complete. Typically the interval between shifts to the second operating mode will be in terms of minutes, hours or even days depending upon the activity in the R2 logical volume 32.

Still in accordance with this invention, each time the BCV/R1 logical volume 34 shifts to its second operating mode, only the data tracks that have been altered during the first operating mode are transferred to the R2 logical volume 40. If the local production site 21 makes repeated changes to a single track of the R2 logical volume 32 between successive shifts to the second operating mode, only one transfer will occur from the BCV/R1 logical volume 34 to the R2 logical volume 40. Such a reduction can lead to a reduction in the bandwidth requirements on the communications link 36. For example, it may be possible to reduce the communications link 36 to a level that will allow transfers over low bandwidth telephone lines or the Internet.

Thus in accordance with this invention data changes made to the R1 logical volume 26 are replicated in the R2 logical volume 32 and then through the BCV/R1 logical volume 34 to the R2 logical volume 40. This process of sequentially transferring the data is characterized as cascading and is controlled by a cascade command set processed by the host 24 at the local or production site 21.

Cascade Command Processing

More specifically, the system operator or an application program being processed at the local production site 21 can effect the cascading operation being performed at the first remote site 22. As known, the host 24 in FIG. 1 will produce various commands including commands in the cascade command set. These commands can be directed to any number of device or addresses including the host adapter 25.

Figure 2:
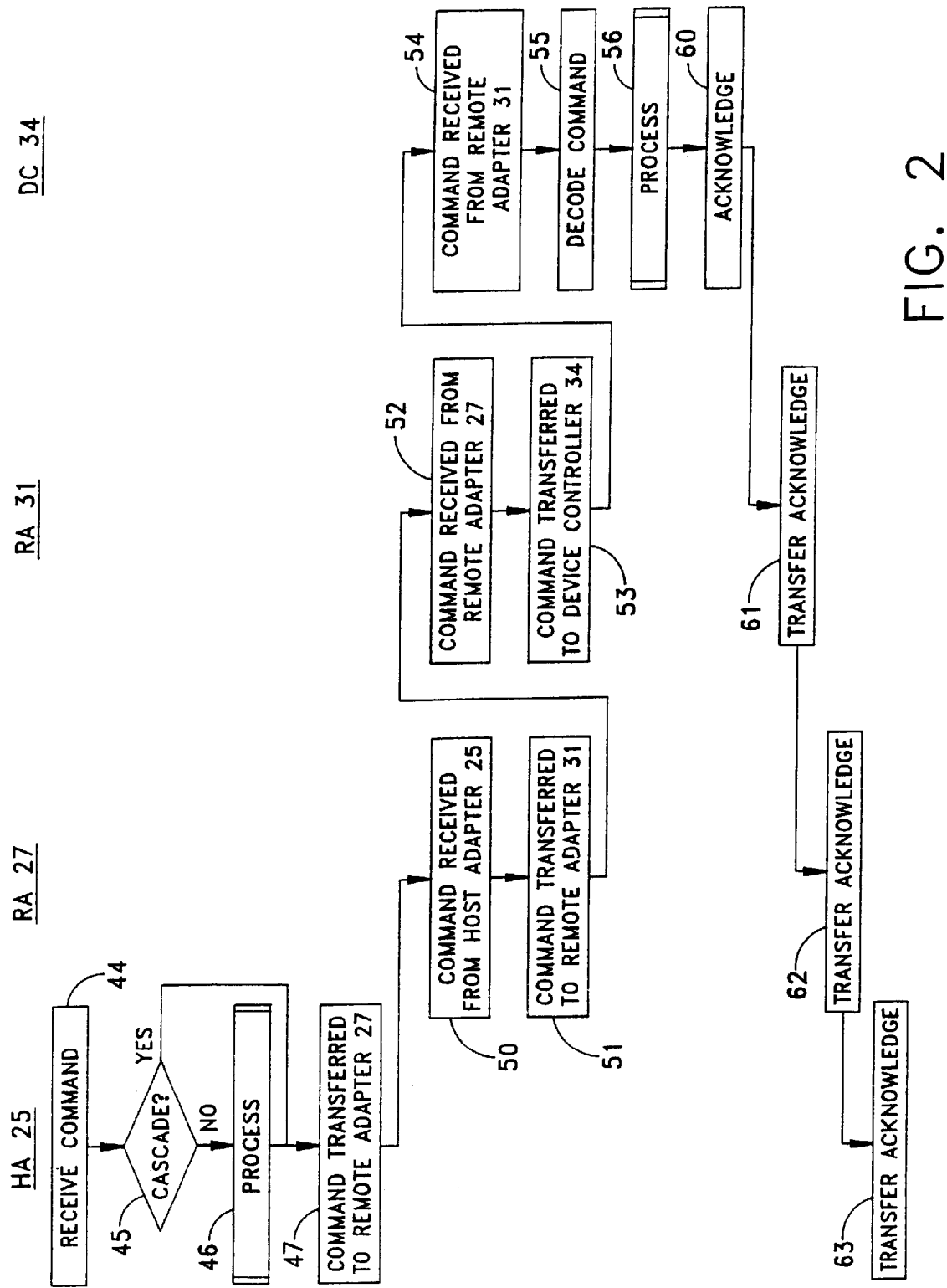
FIG. 2 is a flow diagram that illustrates the transfer of commands from a production facility to a remote storage facility.

Now referring to FIGS. 1 and 2, when the host adapter 25 receives a command, step 44 uses a conventional process to test and decode the command. The test analyzes syntax, context and other related parameters to determine whether a correct command has been received. Step 45 determines whether the command is one of commands in the cascade command set, that is, a cascade command. If it is not, the host adapter 25 uses a procedure 46 to implement a corresponding function. When a valid cascading command is received, the host adapter 25 uses step 47 to transfer the command to the remote adapter 27.

When the remote adapter 27 receives a command at step 50, step 51 merely transfers the command over the communications link 30 to the remote adapter 31 without any further analysis. The remote adapter 31 performs a similar process. That is, the remote adapter 31 receives the command in step 52 and uses step 53 to transfer the command to the device controller 43.

After the device controller 43 receives the command from the remote adapter 31 in step 54, the device controller 43 decodes the command in step 55 and processes that command in step 56.

When the operation defined by the cascade command or other command has been completed, the device controller 43 generates an acknowledgement in step 60 for transfer to the remote adapter 31; steps 61, 62 and 63 represent the process for transferring that acknowledgement back across the communications link to the remote adapter 27 and the host adapter 25 for transfer to the host 24.

Thus, this process allows a program running in the host 24 to issue commands to the device controller 43 in the first remote site that in turn controls the operation of the BCV/R1 logical volume 34. Steps 60 through 63 then provide the necessary feedback so that the host is aware of the completion of any such operation. As a result, there is no requirement for a host such as host 33 in FIG. 1, at the first remote site to implement this invention.

First Remote Site 22

Referring again to FIG. 1, the first remote site 22 includes a number of status registers and tables and program modules for implementing this invention. A control module 70 includes modules for processing various commands including commands in the cascade command set including an EST module 71 for processing an ESTABLISH command, a DS module 72 for processing a DIFFERENTIAL SPLIT command and an REEST module 73 for processing a REESTABLISH command. The ESTABLISH and REESTABLISH commands also perform functions independently of a cascading operation.

Each of the logical volumes includes a dedicated portion for maintaining information about the status of individual physical cylinders and tracks within those cylinders for a device. One such portion of the R2 logical volume 32 is constituted by a dedicated portion 74 that contains a status word for each track. Each status word contains information about the track and dedicates a number of bit positions that are available for various status functions. One of those bit positions will be assigned for use in the cascading process and that bit position will be replicated as a Protection Bits Table 75 that is a 1×n table where n equals the number of tracks in the R2 logical volume 32.

The first remote site 22 also includes an R2 track status table 76 and a BCV/R1 track status table 77. Each of the track status tables 76 and 77 includes a plurality of rows, specifically four rows assigned to four mirror devices or volumes. In normal operations when the BCV/R1 logical volume 34 attaches to the R2 logical volume 32, the bit positions in the M1 row of the R2 track status table 76 correspond to tracks in the R2 logical volume 32; the bit positions in the M2 row, to tracks in the R1 logical volume 26; and bit positions in the M3 row, to tracks in the BCV/R1 logical volume 34 acting in its BCV operating mode. Similarly the BCV/R1 track status table 77 includes a plurality of mirror rows including bit positions in an M1 row for identifying track status for the BCV/R1 logical volume 34 and bit positions in the M2 row for the R2 logical volume 40.

A PB bit register 80 identifies a selected bit position in the Protection Bit table 75 that will be used during a cascading operation. A session flag 81 indicates whether the system is operating in response to cascade commands. A copy program 82 copies data to and from different logical volumes in the first remote site 22 facility as described more fully later.

Operation—First Operating Mode

The first remote site 22 initially will be configured to operate in a first operating mode during which the copy program 82 copies data from the first data store in the form of the R2 logical volume 32 to the second data store in the form of the BCV/R1 logical volume 34 according to changes received at the remote adapter 31. This configuration remains in place until such time as the data on BCV/R1 logical volume 34 is identical to the data stored on the R2 logical volume 32; that is until the two logical volumes are synchronized. Thereafter the first operating mode maintains that synchronism.

Operation—Second Operating Mode

At any time after such synchronism has been achieved, a second operating mode can be established when the host 24 issues a DIFFERENTIAL SPLIT cascade command. Alternatively an optional host 33 at the first remote site could also generate such a command. Issuing the command begins a cascade session.

In response, the device controller 43 will isolate the BCV/R1 logical volume 34 from the R2 logical volume 32 and enable the copy program 82 in FIG. 1 to transfer data from the BCV/R1 logical volume 34 through the remote adapter 35 to a data receiving device as represented by the second remote site 23 in FIG. 1 including the R2 logical volume 40. At any time after those two volumes are synchronized, a REESTABLISH command will revert the system to the first operating mode by detaching the BCV/R1 logical volume 34 from the remote adapter 35 and reattaching it to the R2 logical volume 32 after which the copy program 82 will resynchronize the BCV/R1 logical volume 34 to the R2 logical volume 32. The session continues by issuing subsequent DIFFERENTIAL SPLIT and REESTABLISH commands until a CLOSE SESSION command is generated.

Figure 3:
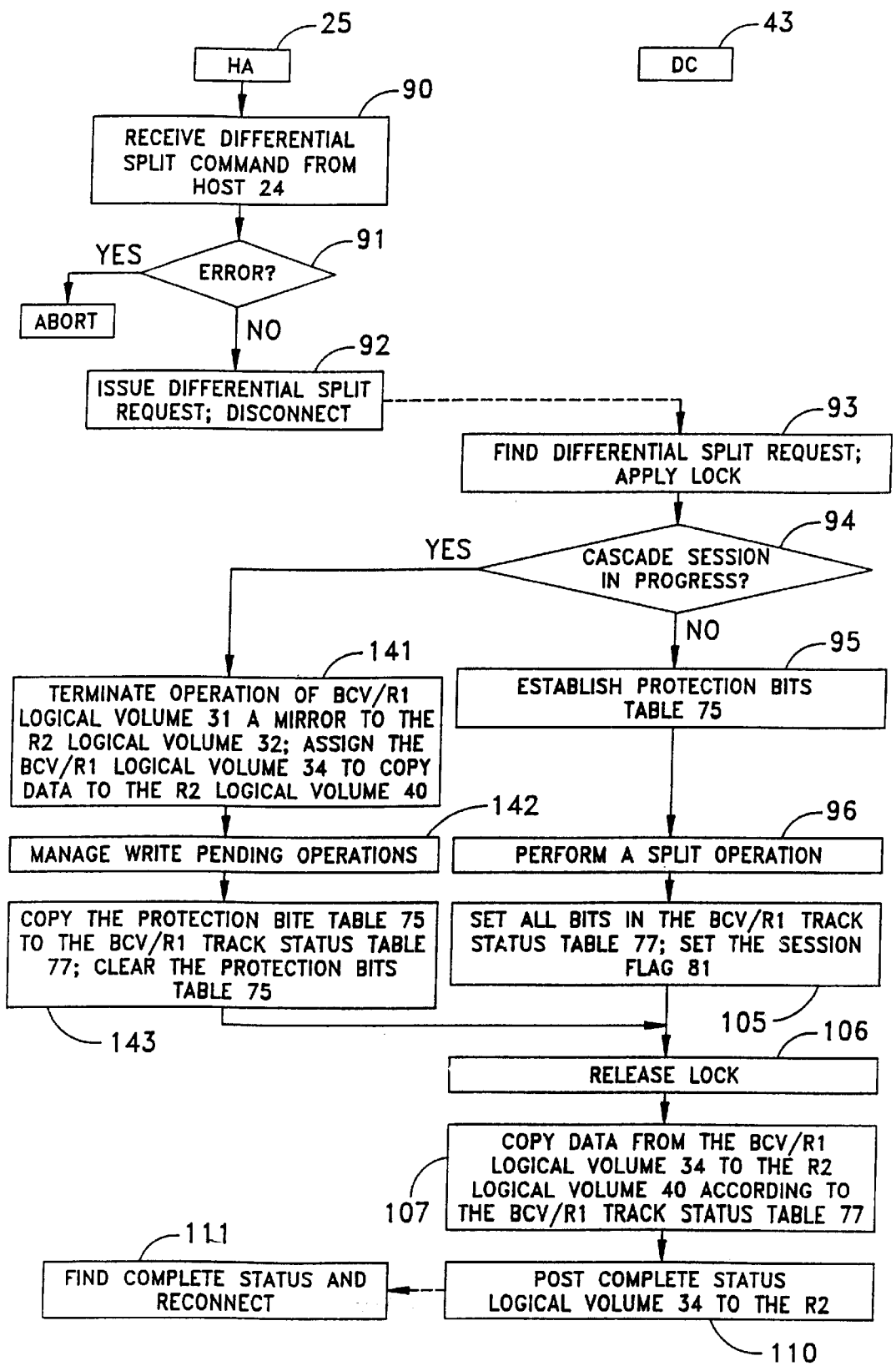
FIG. 3 depicts the operation of the network in FIG. 1 in response to a DIFFERENTIAL SPLIT command.

FIG. 3 depicts operation in response to the receipt of a DIFFERENTIAL SPLIT command in more detail. When the host adapter 25 recognizes that a DIFFERENTIAL SPLIT command has been received in step 90, it tests the command for various possible error conditions as known and as described with respect to step 44 in FIG. 2. If any errors exist, the procedure aborts using a reporting procedure as known in the art. If no errors exist, control passes to step 92 that transfers the DIFFERENTIAL SPLIT command for transfer through the remote adapter 27, communications link 30 and the remote adapter 31 to enable the control 70 to respond.

When the DIFFERENTIAL SPLIT (DS) module 72 responds in step 93, it performs a conventional locking operation to preclude any other applications from effecting the selected logical volume while the lock exists. Step 94 monitors the session flag 81 to determine if a cascading session is in progress. If this is the first differential split operation of a cascading operation, the session flag 81 indicates that the session is not in progress. Control passes to step 95 that establishes the protection bits table 75 based upon data stored at a predetermined location. For example, step 95 may retrieve a protection bits data file from a dedicated portion 74 in the R2 logical volume 32. Alternatively, step 95 may retrieve corresponding information from a copy of such a file that is maintained in memory. In whatever form, each entry corresponds to a track, and each entry contains a plurality of bit positions that can be assigned for arbitrary purposes. Step 95 selects an unused bit position from a table (not shown) identifying any valid uses of different bit positions to establish one bit position for the session that is beginning. Processes for selecting such a bit position are well known in the art. Then the DS module 72 records the selected bit position in PB BIT register 80.

Figure 4:
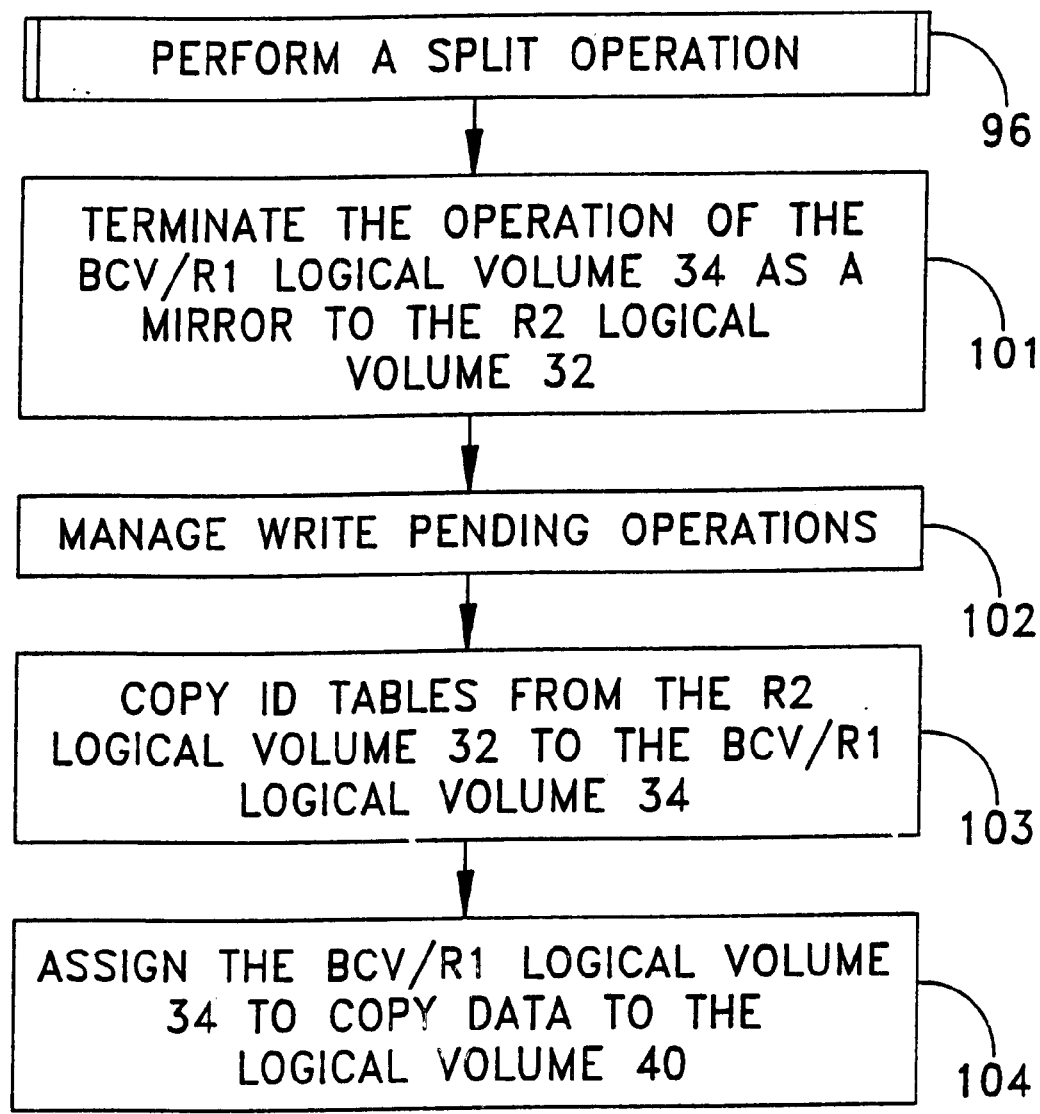
FIG. 4 depicts details of a procedure used in the operation depicted in FIG. 3.

Step 96 represents a procedure for performing a conventional split operation using basic steps from a conventional module. Details of this operation are depicted in FIG. 4. Specifically, step 101 terminates the mirroring operation of the BCV/R1 logical volume 34 as a mirror for the R2 logical volume 32. This action prevents the copy program 82 from transferring data from the R2 logical volume 32 to the BCV/R1 logical volume 34. However, each transfer to the R2 logical volume 32 will be recorded in the M3 row of the R2 track status table 76 thereby to indicate a change in the R1 logical volume 26 that is not reflected in the BCV/R1 logical volume 34.

Step 102 manages WRITE PENDING operations as described in the foregoing U.S. patent application Ser. No. 08/842,953. Next step 103 copies any identification tables from the R2 logical volume 32 to the BCV/R1 logical volume 34 so that the transfer of data from the first remote site 22 to the second remote site will include all the identification information. Step 104 then assigns the BCV/R1 logical volume 34 to copy data to the R2 logical volume 40 at the second remote site 23. This enables the copy program 82 to transfer data to the appropriate destination namely the R2 logical volume 40.

When the operation of FIG. 4 completes, step 105 in FIG. 3 sets all the bits in the M2 bit position of the BCV/R1 track status table 77. Setting all the bits establishes an operating environment in which the data in all the tracks will be transferred to the R2 logical volume 40 in FIG. 1. Step 105 also sets the session flag 81 so it will be clear that during any subsequent DIFFERENTIAL SPLIT the alternate path described later is followed.

Step 106 releases the lock. Step 107 initiates the copy program 82 that begins the transfer of data from the BCV/R1 logical volume 34 to the R2 logical volume 40 according to the data in the BCV/R1 track status table 77, particularly the information in the M3 row. As each copy operation occurs, the corresponding M2 bit in the BCV/R1 track status table 77 is cleared. When all the bits have been cleared, step 110 posts a complete status and a corresponding message is transferred back to the host adapter 25 thereby to indicate to the corresponding application program running in the host 24 that the transfer has been completed.

Operation—Return to First Operating Mode

Figure 5:
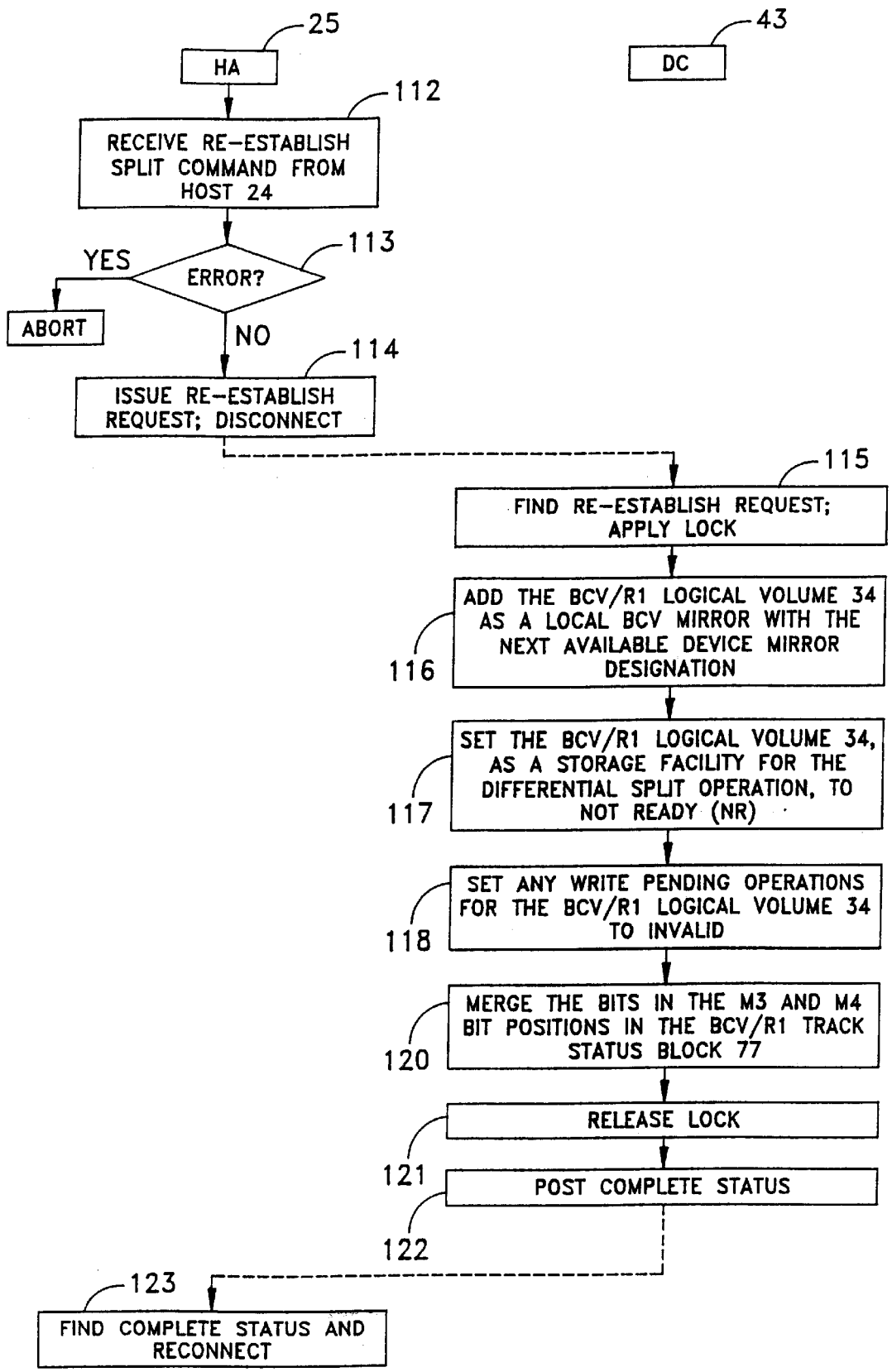
FIG. 5 depicts the operation of the network in FIG. 1 in response to a RE-ESTABLISH command.

At any time after all the data has been transferred to the R2 logical volume 40, the system operator can issue a REESTABLISH command that constitutes another cascade command. Step 112 in FIG. 5 represents receipt of that command in the host adapter 25. Step 113 represents the context and syntax testing of that command with the possibility of aborting the process if an error is detected. Otherwise the host adapter 25 uses step 114 to pass to the device controller 43 command for control transfer through the remote adapter 27 and communications link 30 to the remote adapter 31.

The device controller 43 uses step 115 to indicate the receipt of such a command. Step 116 adds the BCV/R1 logical volume 34 as a local BCV mirror with the next available device mirror designation in the R2 track status table 76. In step 117 the device controller 43 sets the BCV/R1 logical volume 34 acting as a storage facility for the DIFFERENTIAL SPLIT operation to NOT READY (NR). This prevents the COPY program from copying any further data to the second remote site 23. Any WRITE PENDING operations are set to an INVALID state in step 118. As described in the foregoing application, setting any WRITE PENDING operations does not affect the data being stored. Step 120 then merges any bits in the R2 track status table 76 that have been in the mirrored position allocated to the BCV/R1 logical volume 34 (i.e., the M3 bits) with the bits in the M4 bit position for the BCV/R1 track status table 77. During other applications the M4 bit position normally records any changes that are made to the data of the BCV/R1 device. However, no such changes are made during a differential split command when the system operates in the second mode. Consequently step 120 merely obtains the bits in the M3 row of the R2 track status table 76 representing any changes made to the R2 logical volume 32 while the first remote site was operating in the DIFFERENTIAL SPLIT operating mode. Next step 121 releases the lock and step 122 posts a complete status that transfers back to the host adapter 25 to the host 24 in step 123. Now the copy program 82 becomes available for transferring data from the R2 logical volume 32 to the BCV/R1 logical volume 34 according to the contents of the M3 bit positions in the R2 track status register table 76. During each transfer the copy program 82 clears the corresponding bit in the M3 bit positions of the R2 track status register table 76. However, the corresponding bit position in the protection bits table 75 remains unchanged.

Operation—Write to R2 Logical Volume 40

Figure 6:
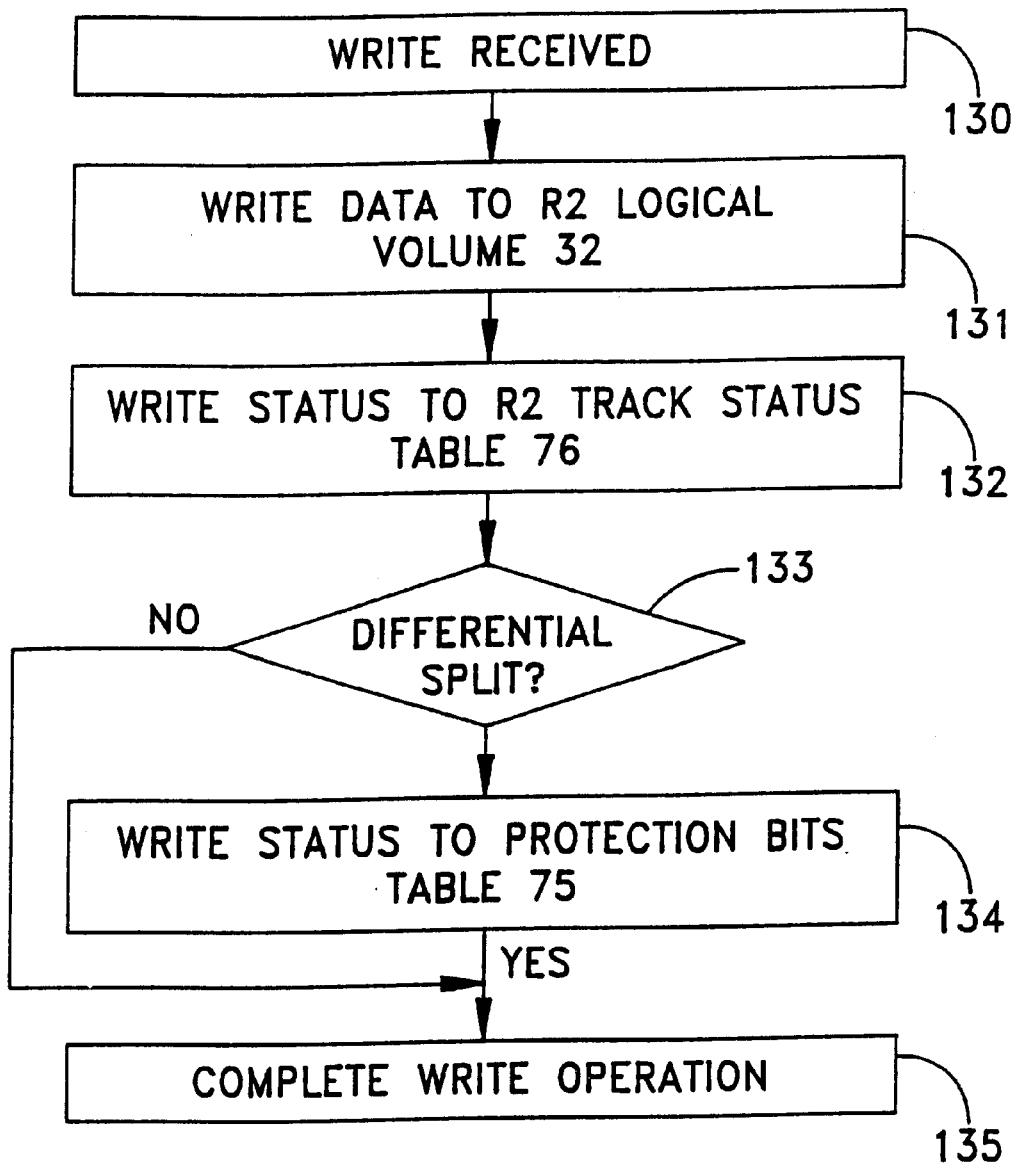
FIG. 6 depicts another operation that occurs after processing a DIFFERENTIAL SPLIT command.

During the interval in which the data storage facility at the first remote site 22 operates in the second operating mode copying data from the BCV/R1 logical volume 34 to the R2 logical volume 40, the host 24 can continue to issue writing operations to the R1 logical volume 26 and the R2 logical volume 32. The remote adapter 31 receives the WRITE data at step 130 at FIG. 6. The information is written immediately to the R2 logical volume 32 in step 131 and the corresponding entries in the R2 track status table 76 are updated in step 132. In this case, the corresponding track bit position in the M3 row would be updated to indicate that WRITE operation had caused a transfer to the R2 logical volume 32, but had not caused a corresponding change in the BCV/R1 logical volume 34. Next the system would look to the session flag 81 to determine if a cascade operation were underway. If it were, step 133 would transfer control to step 134 thereby to write the corresponding status to the Protection Bits Table 75, so that the Protection Bits Table 75 and the M3 row in the track status table 76 would have identical information. Step 134 is bypassed if a cascading operation is not underway. Step 135 then represents the process by which the control 70 completes the write operation. In the case of a normal operation the WRITE operation would complete by transferring the changed data to the BCV/R1 logical volume 34. If the BCV/R1 logical volume 34 were no longer attached, the WRITE request would be made a WRITE PENDING request.

Operation—Successive Differential Split Operations

After some additional time interval, that again may be defined by a system operator and measured in minutes, hours or days, host 21 issues another DIFFERENTIAL SPLIT command. When the device controller 43 receives that command, its control again transfers to the procedure set forth in FIG. 3. In this case, however, the session flag 81 is set so step 94 diverts to step 141 in a manner analogous to that described with respect to step 101 in FIG. 4, terminates the operation of the BCV/R1 logical volume 34 as a mirror to the R2 logical volume 32. This disables any further action of the copy program 82 for the purpose of transferring data from the R2 logical volume 32 to the BCV logical volume 34. Step 142, like step 102, manages all WRITE PENDING operations.

Next, the DS module 72 uses step 143 to copy the Protection Bits Table 75 to the M2 row in the BCV/R1 track status table 77. Then the DS module 72 clears the Protection Bits Table 75. After these operations, the M2 bit positions in the BCV/R1 track status table 77 indicate those tracks in the R2 logical volume 32 that were altered subsequent to a last DIFFERENTIAL SPLIT request being processed. Clearing the protection bits in the protection bits table 75 assures that upon unlocking the logical volumes 32 and 34 any WRITE PENDING operations are properly recorded by setting an appropriate bit in the Protection Bits Table 75.

Next control in the DS module 72 then shifts from step 143 to step 106 to release the lock applied in step 93 and to step 107 whereupon the copy program 82 is enabled to transfer data from the BCV/R1 logical volume 34 to the R2 logical volume 40. However, only data in changed tracks will be transmitted. That is, it is the nature of this command that all DIFFERENTIAL SPLIT operations after a first operation in a session transmit only incremental amounts of information corresponding to data in tracks that have been altered. Moreover the number of tracks of data actually transferred over the communications link 36 normally will be significantly less than the number of writing operations that occurs between successive DIFFERENTIAL SPLIT operations. For example, if during such an interval there have been ten writing operations to different areas on the same track of the R2 logical volume 32, the BCV/R1 device 34 will only contain the latest information and so only one track writing operation will be required to update the R2 logical volume 40 in the second remote site 23. When such repetitive writing operations occur to a single track, the bandwidth requirements for the communications link 36 can be dramatically reduced. It is generally found the requirements can be reduced sufficiently so at least the next lower level of communications bandwidth, such as a T1 line can be used. In many applications it may be possible to reduce the bandwidth requirement even further to a level at which the Internet can be used as a communications link 36.

The sequence of DIFFERENTIAL SPLIT and REESTABLISH commands can continue on an iterative basis so long as it is desired to use the second remote site 23 as a repository for a redundant copy. Once there is no longer any need to maintain the redundant copy, the host can generate a predetermined CLOSE SESSION command. This cascade command releases the assignment of the PB bit position in register 80 and clears the session flag 81 to complete the cascading operation.

This invention has been described in terms of a preferred embodiment in which a local production site 21 is representative of apparatus for periodically altering data in a production data storage facility. In accordance with this invention a first remote site includes a first data store for mirroring the data at the production site. A second data store in the form of the BCV/R1 logical volume 34 has two operating modes. In one, the BCV/R1 logical volume 34 acts as a mirror for the R2 logical volume 32. In the other mode instituted by issuing a DIFFERENTIAL SPLIT or equivalent command, the BCV/R1 logical volume 34 detaches from the R2 logical volume 32 and conveys data identified in the BCV/R1 track status table 77 to the R2 logical volume 40 or other means in the second remote site 23 that acts as a receiver for data from the BCV/R1 logical volume 34.

A data change recording apparatus represented by the Protection Bits Table 75 records any changes to the R2 logical volume 32 while the contents of the BCV/R1 logical volume 34 are being transferred to the R2 logical volume 40 during the second operating mode. When control shifts the BCV/R1 logical volume 34 back to the first operating mode, the data change recording identifies those tracks or other data blocks that must be transferred from the R2 logical volume 32 to the BCV/R1 logical volume 34. This changed data recording further controls those tracks that are transferred from the BCV/R1 logical volume 34 to the data receiving site such as the second remote site 23 when the system again shifts the operation of the BCV/R1 logical volume 34 to the second operating mode.

There are many variations that can be made to the specifically disclosed embodiment shown in FIGS. 1 through 6. FIG. 1 for example, depicts a specific organization of tables and modules. It will be apparent that different configurations of the information could be substituted without detracting from the overall operation of the first remote site 22. FIGS. 1 through 6 further depict the operation in conjunction with a single logical volume. Generally a network will include multiple logical volumes, each of which could be handled in this same way by replicating the operation and apparatus shown in FIGS. 1 through 6. Moreover, the description of the various modules establishes specific sequences of events for purposes of explanation; other sequences might also be included with the elimination of some or addition of other operations such as are necessary for other ancillary operations. Such sequences can be under manual control so that each transfer between operating modes will be initiated by a system operator. Alternatively, all or portions of a cascading session might be under automatic control. Thus while this invention has been disclosed in terms of certain embodiments, it is the intent of the appended claims to cover all such variations and modifications as come within the true spirit and scope of this invention.

What is claimed as new and desired to be secured by Letters Patent of the United States is:

1. A data network with means for altering data and means for receiving data in a data processing system, said data network comprising:
   A) a first data store for connection to the data altering means for receiving data therefrom,
   B) a second data store,
   C) first and second change recording means for identifying the location of any change that the data altering means makes in said first data store,
   D) first operating means for establishing a first operating mode during which said second data store receives data from said first data store according to the changes recorded in said first change recording means,
   E) second operating means for establishing a second operating mode for copying data from said second data store to the receiving means according to the changes recorded in said second change recording means that reflect the recorded changes in said first data store at the time the second mode is established.

2. A data network as recited in claim 1 wherein said first and second change recording means include first and second tables, respectively and transfers within said data network occur as data blocks and wherein said first data store includes storage for diverse information about each data block and said second table in said second change recording means receives the diverse information, said second operating means transferring the contents of said second table to a third table that controls the transfer of data from said second data store to the receiving data means.

3. A data network as recited in claim 1 wherein transfers within said data network occur as data blocks and wherein a portion of said first data store contains information about changes to each data block and wherein said network additionally includes a third change recording means and said second operating means transfers the contents of said first data store portion to said third change recording means at the time that the second mode is established.

4. A data network as recited in claim 3 additionally including control means responsive to predetermined data received from the altering means for enabling said first and second operating means on a mutually exclusive basis.

5. A data network as recited in claim 3 additionally including control means responsive to iteratively generated first and second commands from the altering means for effecting a cascading session during which said control means alternately and iteratively enables said first and second operating means on a mutually exclusive basis.

6. A data network as recited in claim 5 wherein said first, second and third change recording means comprise first, second and third tables, respectively and wherein said second table receives change information from the stored diverse information, said network additionally including copy means for transferring data, said second operating means initializing said second table and setting all data in said third table to a first state during a first iteration in a cascading session for enabling said copy means to transfer all the data in the second data store to said receiving means.

7. A data network as recited in claim 6 wherein said first operating means on succeeding operations responds to a data block change by altering the corresponding data in said first and second tables and second operating means, on successive operations, transferring corresponding data front said second table to said third table.

8. A data network comprising:
   A) a production site with a host and an associated production site storage facility,
   B) a remote site with an associated remote site storage facility,
   C) a storage facility for interconnecting the production site and the remote site wherein the host can issue a plurality of cascade commands,
   D) a first data store for connection to the production facility for receiving data therefrom on a track-by-track basis,
   E) a second data store,
   F) first and second track status tables for identifying each track in said first data store that the production site changes,
   G) first operating means for establishing a first operating mode in response to a first cascade command during which said second data store receives data from said first data store according to the changes recorded in said first track status table,
   H) second operating means for establishing a second operating mode in response to a second cascade command for copying data from said second data store to the remote storage facility according to the changes transferred from said second track status table to a third track status table at the time the second mode is established.

9. A data network as recited in claim 8 wherein said first data store includes storage for diverse information about each track and said second track status table receives the diverse information.

10. A data network as recited in claim 8 additionally including control means responsive to predetermined data received from the production facility for enabling said first and second operating means on a mutually exclusive basis.

11. A data network as recited in claim 8 additionally including control means responsive to iteratively generated first and second commands from the production facility for effecting a cascading session during which said control means alternatingly and iteratively enables said first and second operating means on a mutually exclusive basis.

12. A data network as recited in claim 11 additionally including copy means for transferring data, said second operating means initializing said second table and setting all data in said third table to a first state during a first iteration in a cascading session whereby said copy means transfers all the data in the second data store to said receiving means.

13. A data network as recited in claim 12 wherein said first operating means on succeeding iterations alters corresponding data in said first and second tables and second operating means, on successive iterations, transfers corresponding data from said second table to said third table.

14. A data network as recited in claim 8 additionally comprising means for establishing a communications link between said first and second data stores and the remote site.

15. A data network as recited in claim 8 additionally comprising means for establishing a communications link between the production site and said first and second data stores.

16. A data network as recited in claims 15 additionally comprising means for establishing a communications link between said first and second data stores and the remote site.

17. A data network as recited in claim 15 additionally comprising means for establishing a communications link between said first and second data stores and the remote site and wherein each of said communications links has a different characteristic bandwidth.

18. A data network as recited in claim 15 additionally comprising means for establishing a communications link between said first and second data stores and the remote site and wherein said communications link to the production facility has a greater characteristic bandwidth than said communications link to the remote site.

19. A method for transferring data between a first facility in a network for altering data and a second facility in a network for receiving data including the steps of:
   A) establishing a first data store for receiving the altered data in the first facility,
   B) establishing a second data store,
   C) recording the identification of changes in the first data store produced by the facility for altering data in first and second locations,
   D) establishing a first operating mode during which the second data store receives data from the first data store according to the identified changes in the first locations,
   E) establishing a second operating mode for copying data from the second data store to the second facility according to the changes in the second locations identified at the time the second operating mode is established.

20. A method as recited in claim 19 wherein data transfers occur as data blocks and wherein the first data store includes storage for diverse information about each data block and said step of identifying changes includes establishing third locations for recording an identification of changes and said second operating mode establishment transferring the contents of the second locations to the third locations for enabling the copying to the receiving facility.

21. A method as recited in claim 19 wherein data transfers occur as data blocks and wherein a portion of the first data store contains information about changes to each data block, the contents of the first data store portion being transferred to the second locations to provide initial identification information at the time that the second operation mode is established.

22. A method as recited in claim 21 wherein the first and second operating modes operate on a mutually exclusive basis in response to predetermined data from the altering facility.

23. A method as recited in claim 21 wherein an iterative generation of first and second commands from the altering facility effects a cascading session during which the first and second operating modes are enabled on a mutually exclusive basis, iteratively.

24. A method as recited in claim 23 additionally wherein data is transferred by copying, the initial operation of the second operating mode initializing the second locations and setting all data in third locations to a first state during a first iteration in a cascading session whereby said copying transfers all the data in the second data store to the receiving facility.

25. A method as recited in claim 24 wherein the first operating mode on succeeding operations responds to a data block change by altering the corresponding data in the first and second as locations and the second operating mode, on successive operations, transferring corresponding data from the second locations to the third locations.

26. A method for transferring data between a production site with a host and an associated production site storage facility and a remote site with an associated remote site storage facility, wherein the host can issue a plurality of cascade commands, said method comprising the steps of:
   A) establishing a first data store for receiving data from the production facility on a track-by-track basis,
   B) establishing a second data store,
   C) defining a first and second track status tables for identifying each track in the first data store that the production site changes and a third track status table that identifies changes in the second data store,
   D) establishing a first operating mode in response to a first cascade command during which the second data store receives data from the first data store according to the changes recorded in the first track status tables,
   E) establishing a second operating mode in response to a second cascade command for copying data from the second data store to the remote storage facility according to the changes transferred to the third track status from the second track status table at the time the second mode is established.

27. A method as recited in claim 26 wherein the first data store includes storage for diverse information about each track and the second table receives the diverse information.

28. A method as recited in claim 27 wherein additionally including the step of enabling the first and second operating means on a mutually exclusive basis to predetermined data received from the production facility.

29. A method as recited in claim 27 additionally including the step of effecting a cascading session during which the control means alternatingly and iteratively enables the first and second operating means on a mutually exclusive basis in response to iteratively generated first and second commands from the production facility.

30. A method as recited in claim 29 additionally including the step of copying data to effect a data transfer, said method including initializing the second track status table and setting all data in the third table to a first state during a first iterative in the second operating mode in a cascading session whereby the copy means transfers all the data in the second data store to the receiving means.

31. A method as recited in claim 30 wherein during the first operating mode alters corresponding data in the first and second tables and during second operating mode, on successive iterations, corresponding data from the second table transfers to the third table.

32. A method as recited in claim 27 wherein said first and second data stores are geographically remote from the remote site, said method additionally comprising the step of establishing a communications link between said first and second data stores and the remote site.

33. A method as recited in claim 27 wherein said first and second data stores are geographically remote from the production facility, said method additionally comprising the step of establishing a communications link between the production site and said first and second data stores.

34. A method as recited in claim 33 wherein said first and second data stores are geographically remote from the remote site, said method additionally comprising step of establishing a communications link between said first and second data stores and the remote site.

35. A method as recited in claim 33 wherein the steps of establishing the communications links establishes communications links with different characteristic bandwidths.

36. A method as recited in claim 33 wherein the step of establishing the communications links establishes a communications link to the production facility with a greater characteristic bandwidth than the communications link to the remote site.

* * * * *